United States Patent [19]
Roesch

[11] Patent Number: 4,987,668
[45] Date of Patent: Jan. 29, 1991

[54] MACHINE-TOOL

[75] Inventor: Edouard Roesch, La Chaux-de-fonds, Switzerland

[73] Assignee: Dixi S.A., Switzerland

[21] Appl. No.: 465,920

[22] Filed: Jan. 16, 1990

[30] Foreign Application Priority Data

Jan. 25, 1989 [CH] Switzerland ............................ 218/89

[51] Int. Cl.⁵ ...................... B23Q 3/157; B23C 1/027; B23C 1/14
[52] U.S. Cl. ...................................... 29/568; 409/145; 409/165; 409/198; 409/212; 409/221
[58] Field of Search .................. 29/568; 409/145, 215, 409/235, , 212, 163-165, 198, 221-223

[56] References Cited

U.S. PATENT DOCUMENTS

| | | | |
|---|---|---|---|
| 2,671,233 | 3/1954 | Marchant et al. | 409/165 X |
| 2,699,695 | 1/1955 | Addison | 409/165 X |
| 3,587,389 | 6/1971 | Kreimer | 409/212 X |
| 4,635,342 | 1/1987 | Balding | 409/212 X |
| 4,669,174 | 6/1987 | Fischer et al. | 29/568 |

FOREIGN PATENT DOCUMENTS 491252  3/1986  U.S.S.R. ............................ 409/235

Primary Examiner—Steven C. Bishop
Attorney, Agent, or Firm—Silverman, Cass & Singer, Ltd.

[57] ABSTRACT

The spindle of a machine-tool is mounted on a carriage movable along a horizontal transverse member which is carried by the columns of a part of the frame of the machine having the shape of a closed porch, and which is situated in front of these columns. This transverse member moves vertically along the columns. The workpiece-carrying table, which can rotate on itself, is mounted on a carriage movable in a direction parallel to the spindle axis on a portion of the frame situated in front of the porch. Thus, the machine is compact and, whatever the extreme positions of its movable elements might be, no cantilever condition is produced which could generate machine deformations.

3 Claims, 1 Drawing Sheet

MACHINE-TOOL

BACKGROUND OF THE INVENTION (a) Field of the Invention

The present invention relates to a machine-tool of the type provided with a horizontal rotative spindle, the frame of which is a closed porch-shaped frame.

(b) Description of the Prior Art

Machine-tools of the foregoing type, most generally boring or reaming machines, generally have a spindle support which is situated between the vertical pillars of the porch-shaped frame between which it moves vertically. So far as the workpiece-carrying table is concerned, it is mounted in front of said porch so as to be able to move in two mutually perpendicular directions, one of which is transverse, that is to say perpendicular to the axis of the spindle, and the other one of which is longitudinal, that is to say parallel to this axis.

The drawback of this arrangement lies in the fact that, when the table is largely out of the center of the frame, in the neighbourhood of one or the other of its extreme lateral positions, the frame of the machine receives a deformation such that the accuracy of machining is jeopardized. The effect of this deformation is more serious as the point at which machining is effected is spaced from the surface of the table, in other words the bad effect of the deformation of the frame becomes more important when the spindle is situated at a high level. The reason is that the rocking movement impelled to the workpiece due to the deformation of the frame can be considered as having its center in the vicinity of the surface of the table and, consequently, is amplified by the distance between this table and the machining point.

Another drawback due to the conventional construction of such machines lies in the fact that, the space within the porch being occupied by the spindle support which must be able to move therein entirely, it is not possible to employ measures to control the deformation of the frame, for instance by using laser rays, since the latter would be intercepted by the spindle support.

These machines moreover have the drawback that they occupy, in front of the porch, a large space in the widthwise sense, due to the fact that the table must be able to move transversely. This is not convenient for the distribution of the accessories of the machine and, especially, prevents a tool changer being placed in front of the porch.

SUMMARY OF THE INVENTION

The present invention has for its object to remove the aforesaid drawbacks.

This object is achieved in accordance with the invention due to the fact that the spindle of the machine is carried by a carriage movable transversely with respect to the spindle along a horizontal transverse member, mounted on the columns of the porch and in front of the latter along which it moves vertically, the table of the machine which is situated in front of said columns being mounted in such a way as to be able to move longitudinally, that is to say parallel to the axis of the spindle.

The various features of the invention will be apparent from the following description, drawings and claims, the scope of the invention not being limited to the drawings themselves as the drawings are only for the purpose of illustrating ways in which the principles of the invention can be applied. Other embodiments of the invention utilising the same or equivalent principles may be used and structural changes may be made as desired by those skilled in the art without departing from the present invention and the purview of the appended claims.

DESCRIPTION OF THE PREFERRED EMBODIMENTS

Figure 1:
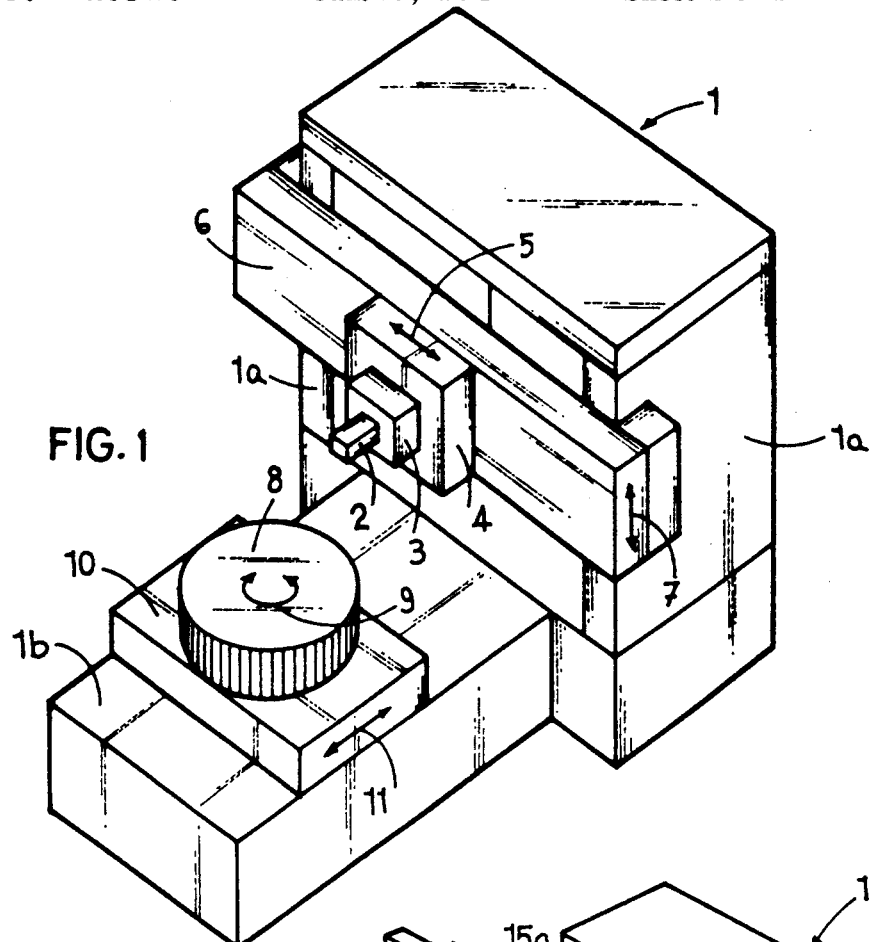
FIG. 1 is a diagrammatic perspective view of a boring or reaming machine having a horizontal spindle.

The machine represented in FIG. 1 comprises a closed porch-shaped frame, generally designated by reference 1, the two vertical columns of which are designated by reference 1a, which is prolongated by a horizontal portion 1b, constituting a bed, situated in front of said columns.

The spindle of the machine, having a horizontal axis and which is designated by reference 2, is carried by a headstock 3 which is itself mounted on a carriage 4 moving itself transversely, that is to say perpendicularly to the axis of the spindle 2, in the direction of the arrow 5, corresponding to the "X" machining axis along a horizontal transverse member 6 carried by the columns 1a of the porch. This transverse member is situated in front of the columns, along which it moves vertically in the direction of the arrow 7, which corresponds to the "Y" machining axis.

The workpiece-carrying table, diagrammatically represented at 8, is mounted in such a way that it is able to rotate on itself, as indicated by arrow 9. The table 8 is carried by a carriage 10 which moves longitudinally, that is to say parallel to the axis of the spindle 2, in the direction of the arrow 11, which corresponds to the "Z" machining axis.

This way, owing to the general geometry of the machine, there is no cantilever condition, whatever the extreme positions of the several movable elements of the machine might be, so that there is no exaggerated deformation of the machine frame 1.

Moreover, the inside of the porch is entirely free, that enables any possible deformation easily to be controlled, and corrected, by means of optical sights or by application of laser rays which are not obstructed by anything. It is easy, especially, to control the position, in height, of each of the ends of the horizontal transverse member 6 carrying the carriage 4 and to correct it, if necessary, by acting appropriately on one or the other end of said transverse member by means of vertical screws located in the columns 1a, which screws (not shown) serve to sustain the transverse member 6 and to control its Y axis movements.

It is to be noted that the anchoring points of the machine to the ground will be three in number, two of them being placed at the rear of the vertical columns 1a of the frame 1 and the third of them being situated substantially in the center of the horizontal bed 1b.

Figure 2:
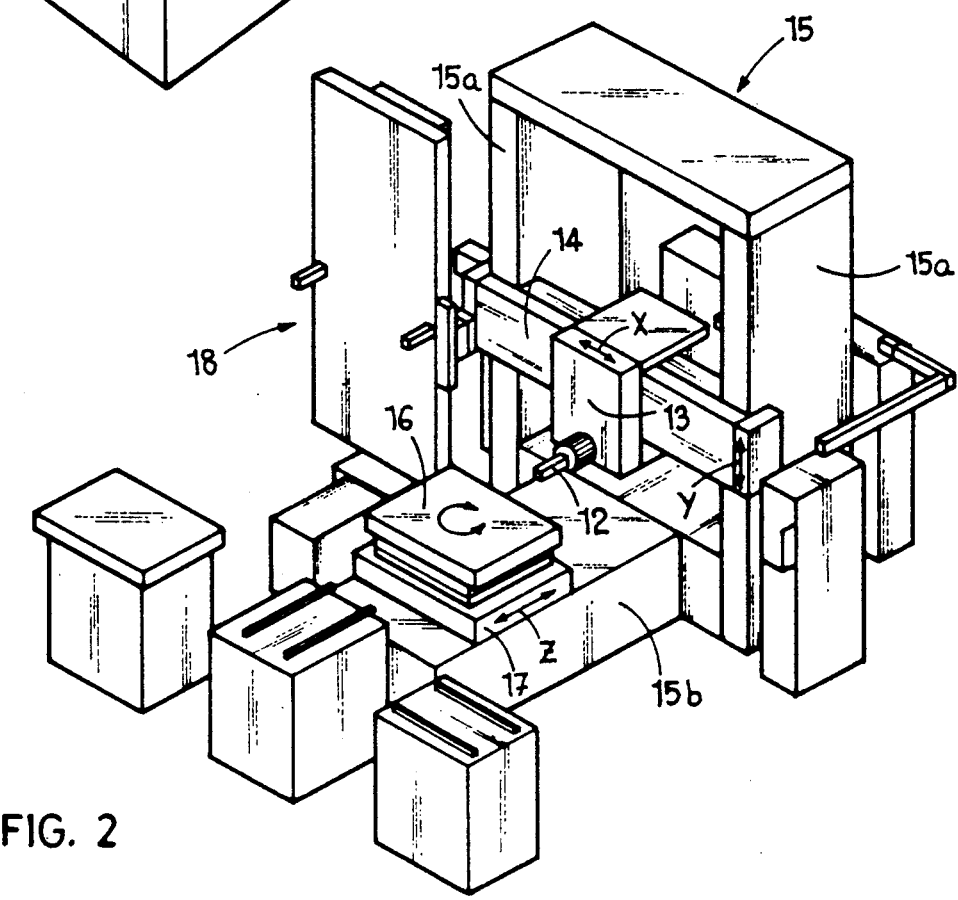
FIG. 2 is also a perspective view, also diagrammatic, of a work center comprising a boring or reaming machine having a horizontal spindle.

In the work center represented in FIG. 2, one finds a machine of similar type to that of FIG. 1, constituted by a reaming machine having a horizontal spindle 12 carried by a carriage 13 movable along the X axis along a horizontal transverse member 14 itself movable along the Y axis along two columns 15a of a closed porch, generally designated by 15, forming part of the frame of the machine. A rotatable workpiece-carrying table 16 is mounted on a carriage 17 moving along the Z axis on a portion 15b of the frame situated in front of the porch 15.

As can be seen, the surroundings of the machine are clear for receiving accessories such as, especially, a tool changing device, generally designated by 18. Owing to the fact that this tool changing device is situated in front of the porch 15, the spindle can grip directly the tool it carries, without it being necessary to have a transporting arm, and still less a transporting arm effecting a conversion movement as is necessarily the case when the tool store cannot be situated in front of the porch, which necessitates picking up of the tools in the rear portion of the machine, and bringing them in front of the latter, in a pivotal movement.

I claim:

1. A machine-tool having a rotatable horizontal spindle and comprising a frame, said frame including a closed porch with two vertical columns, a horizontal transverse member mounted on and in front of a front surface of said columns, said transverse member being movable vertically along said front surface of said columns, a carriage movable transversely with respect to said spindle and along said transverse member, aid spindle being carried by said carriage, a table situated in front of said columns and mounted in such manner as to be movable longitudinally, that is parallel to the axis of said spindle, and means for rotatably mounting a workpiece to a top surface of said table.

2. A machine-tool as claimed in claim 1, comprising a tool changing device situated in front of said porch.

3. A machine-tool comprising:
   a spindle;
   a closed porch frame including first and second columns extending in a vertical, y-axis direction and positioned a predetermined distance from one another, said first and second columns including respective first front surfaces thereon substantially parallel to one another and contained within a first plane extending in a horizontal, x-axis direction and the y-axis direction;
   a first elongated support member;
   first means for mounting and providing vertical movement in the y-axis direction to said first elongated support member between said first and second vertical columns on said first front surfaces of said first and second vertical columns;
   a first carriage mounted on and movable along said first support member in the horizontal, x-axis direction, said spindle being operable secured to said first carriage and extending in a fixed horizontal, z-axis direction perpendicular to said first plane;
   a support bed positioned proximate to a bottom end and in front of said first plane and said first front surfaces of said first and second columns and extending outwardly away from said first plane in the horizontal, z-axis direction;
   a table for positioning a workpiece with respect to said spindle;
   rotatable mounting means connected to a top surface of said table, said rotatable mounting means being capable of supporting a workpiece thereon and rotatable positioning said workpiece about said vertical, y-axis with respect to said spindle; and
   second means for mounting said table to said support bed and providing movement of said table in said horizontal, z-axis direction perpendicular to said first plane from a first initial position remote from and in front of said first plane to a second final position proximate the front of said first plane without crossing said first plane so that a workpiece can be positioned on said table in front of said first plane, said spindle can be positioned in both said vertical, y-axis and said horizontal, x-axis directions to a desired position with respect to the workpiece, said workpiece can be rotated about said vertical y-axis on said table, and said table can be movable in the horizontal, z-axis direction by said second means for moving, to selectively engage a desired peripheral surface of said workpiece with said spindle, in front of said first plane.

* * * * *